3,054,816
CYCLIC ALKOXY- AND PHENOXY-ALUMINUM OXIDE TRIMERS AND PROCESS FOR MAKING SAME
Jacobus Rinse, Bernardsville, N.J., assignor, by mesne assignments, to Agrashell, Incorporated, Los Angeles, Calif., a corporation of Delaware
No Drawing. Filed June 30, 1958, Ser. No. 745,334
23 Claims. (Cl. 260—448)

This invention relates to new compounds definable as cyclic alkoxy- and phenoxy-aluminum oxide trimers, to methods of producing the same and as well, to the production of various substituted cyclic aluminum oxide trimers therefrom.

I have heretofore devised methods for producing cyclic aluminum oxide acylate polymers involving the production of the linear polymers and then converting the linear polymers into cyclic polymers. The methods, however, involve conditions of production making it difficult to produce the products in high yields or in desired pure form.

An object of the present invention is to produce cyclic aluminum oxide alkoxy trimers and acylate trimers of superior purity by processes employing procedures and conditions which consistently lead to the production of the purer cyclic trimers in high yields.

More specifically one of the objects is to provide improved processes for producing cyclic alkoxy aluminum oxide trimers and the corresponding phenoxy compounds. Another is to produce more efficiently various cyclic acylated aluminum oxide trimers.

Basically, one process of the present invention leading to the production of cyclic alkoxy aluminum oxide trimers involves introducing steam or water vapor into fluid aluminum alkoxide of an alcohol of 2–5 carbon atoms in substantially equi-molecular proportions at an elevated temperature at which reaction involving condensation occurs and at which alcohol is liberated and vaporizes off as the reaction proceeds, the heating being continued at the same or a higher temperature until about two mols of alcohol are liberated and removed per mol of aluminum compound used.

The aluminum alkoxide may be derived from any alcohol of 2–5 carbon atoms, either unsubstituted or substituted with non-functional groups, i.e. groups which are non-reactive in the claimed reaction. The alcohol may be straight or branched, primary or secondary, saturated or unsaturated. Alkoxides of isopropyl alcohol and ethyl alcohol are preferred for most purposes. Other examples are furfuryl and allyl alcohols.

The ratio of water reacted with the alkoxide cannot be varied to any substantial extent from 1:1 mols without preventing or interfering with the claimed reaction. The amount of water can be slightly less than one mol per mol of aluminum alkoxide, but generally not less than 85%. Any water in excess of one mol is detrimental, for it forms hydroxy derivatives which are less soluble than the desired products and ultimately they apparently form hydrated aluminum oxide, a very stable and non-reactive compound.

The reaction is preferably carried out in the presence of an organic solvent or a mutual solvent which serves to moderate the speed of the reaction and assist in the prevention of the formation of insoluble hydrates. Aromatic hydrocarbons such as toluene and xylene can be employed and also lower molecular alcohols. The reaction in the presence of the alcohol can be effectively carried out by preparing an azeotropic mixture of the water with the alcohol and boiling the mixture to provide vapors containing the steam to be reacted with the aluminum alkoxide. The liquid condition of the aluminum alkoxide can be obtained by dissolving the same in one of the solvents hereinbefore mentioned or by heating the mass to a temperature which melts the same.

During the introduction of the water vapor, the reaction mass is maintained at a temperature at which the reaction proceeds with liberation of alcohol, ordinarily at 70° C. or higher. At atmospheric pressure, the temperature during the introduction of the water can be at about 80° C., and ordinarily should not be above about 120° C. The maximum permissible temperature depends upon the pressure. Too high temperatures or too low pressures will prevent the retention of the water in the reacting mass for a sufficient period to bring about reaction or will evaporate the alkoxide before it can react.

The addition of the water vapor whether accompanied by solvent vapors or not is preferably effected at a slow rate during constant agitation of the aluminum oxide reaction mass. Alcohol corresponding to the alkoxide radical or radicals of the aluminum compound liberated during the reaction, is removed as the reaction proceeds. However, during the introduction of the steam, the liberated alcohol may be retained temporarily with advantage in the reaction mass by refluxing. After the completion of the introduction of the water or when the reactants have been combined, the heating and reaction is continued with simultaneous removal of the liberated alcohol. The reaction is preferably completed at a temperature above about 150° C. up to about 200° C. or any higher temperature below that which will cause decomposition of the particular compound being formed. The completion of the reaction and the evaporation of the last part of the alcohol and any solvents employed may be assisted by the application of a vacuum, for example, up to 1–2 inches.

As soon as the above described reaction mass begins to thicken or gel after about two-thirds of the liberatable alcohol has been removed, the reaction can be facilitated by transferring the thickened or viscous mass to a special evaporator, for example a heater of the dough-mixer type or of heated drum or roll type, the evaporation being completed with the aid of a vacuum.

The evaporated alcohol obtained in the foregoing process can be condensed and re-employed for the manufacture of additional aluminum alkoxide.

The foregoing process can be advantageously modified to effect reaction in the vapor phase. In accordance with this important embodiment, steam and vapors of any of the hereinbefore mentioned aluminum alkoxides are mixed and reacted at a temperature at the elevation required for the completion of the condensation and liberation of all the alcohol required to form the cyclic alkoxy aluminum oxide trimers. At the high temperature of 150°–180° C. or more, the alcohol liberated remains in vapor form and passes off from the reaction zone. The cyclic compound formed precipitates in the reaction zone generally as a fluffy white powder. The reaction is facilitated by carrying it out in the presence of lower molecular alcohol vapors and agitating the reacting mass during the heating operation. The temperature employed maintains the reactants in the vapor phase and eventually the liberated alcohol as well as any added alcohol is driven from the reaction zone preferably with the aid of a vacuum, leaving the solid aluminum oxide trimers formed in the reaction vessel. Since the aluminum alkoxides possess relatively high boiling points, it is sometimes necessary to avoid excessively high temperatures by effecting the vaporization with the aid of a vacuum.

In a less desirable but effective embodiment of the invention, water and alcohol are introduced into the aluminum alkoxide, all being in the liquid state, the molar proportions of the three ingredients being approximately 1:1:1. The alcohol used may be of any number of carbon atoms, branched or straight chained, primary or secondary, unsubstituted or substituted with non-functional groups. When the alcohol corresponds to the alkyl radical of the alkoxide or is of a lesser number of carbon atoms, the inert alcohol serves as a mutual solvent and the cyclic alkoxy compound formed corresponds to the alkoxide treated. However, when the alcohol has a higher number of carbon atoms than the alkyl group of the alkoxide, substitution occurs and a cyclic alkoxy aluminum oxide trimer of a higher molecular weight is obtained. Aluminum phenoxides may be employed in the place of the aluminum alkoxides, examples being aluminum cresoxide and the corresponding derivatives of alkylated phenols and substituted phenols. The products resulting from the reaction may be defined as cyclic trimer alumina R-oxides in which R is a hydrocarbon group.

In bringing about the reaction in which the three components are brought together, the procedures, temperatures, and solvents hereinbefore discussed in relation to the first mentioned or liquid phase reaction are employed.

In a special embodiment of the invention, the reaction between the water vapor and liquid aluminum alkoxide is carried out in the presence of an organic solvent of the nature of a higher molecular hydrocarbon or hydrocarbon mixture, examples of which are mineral spirits and mineral oils including lubricating oils. This higher molecular organic solvent provides a homogeneous liquid medium for the reaction inasmuch as the cyclic trimers are unmeltable. The solvent can be retained in the reaction product or if it possesses sufficient volatility it may be removed, partly or wholly, by vaporization either during or after completion of the cyclization reaction. To accomplish the reaction in the presence of the higher molecular compound, no change in the procedures, temperatures or other factors employed in the liquid phase reaction is required.

The foregoing process can be employed as the initial step for the production of greases having high dropping points. For example, the cyclic isopropoxy (or other alkoxy) aluminum oxide trimer produced in the presence of a mineral oil of from 200 to 1200 S.U.S. in the proportion of 1-5% of the trimer may be reacted with (1) from 2-6% of stearic acid or a corresponding amount of other saturated or unsaturated fatty acid having at least 12 carbon atoms and with (2) from 0.5-2% of benzoic acid, by heating the mixture to a temperature of from about 100 to 200° C. until thickening has occurred. The resulting greases will have high dropping points, as high as 250° C. or higher. Alternatively the grease may be prepared by first forming the cyclic aluminum oxide stearate trimer, next mixing the trimer with the mineral oil and finally reacting with the benzoic acid at the elevated temperature.

In a preferred specific procedure, cyclic isopropoxy aluminum oxide trimer is produced in a mineral lubricating oil of 700 S.U.S. in proportions to provide a 2% solution. To this solution stearic acid and benzoic acid are added in proportions to provide a mass containing 3% and 1% respectively based on the quantity of mineral oil, and the mass is heated to 150-200° C. until thickening occurs.

The novel cyclic alkoxy aluminum oxide trimers of the invention may be produced by a process different from those discussed above which involves merely the heating of an aluminum alkoxide of an alcohol of from 2-5 carbon atoms to a high temperature at which the condensation proceeds at an adequately rapid speed accompanied by the formation of an ether of liberated alkoxy and alkyl groups. Reaction over a period of several hours appears to be necessary to complete the reaction. The ether is given off slowly at first and more rapidly later at a gradually accelerated rate. The ether vapors may be condensed and recovered. To accomplish the reaction, temperatures of from 200-300° C. or higher are ordinarily required and the reaction may be carried out under atmospheric pressure or a higher pressure. The temperature should be below that which will vaporize the aluminum alkoxide from the reaction mass. In this process, it is desirable to react initially under reflux and to operate the rest and major part of the reaction during distillation of the liberated ether. In the reaction, the clear liquid reaction mass begins to thicken after several hours heating and then solidifies rather rapidly. The heating is continued until the calculated loss in weight by ether development has occurred. The solid product remaining in the reaction vessel is a cyclic alkoxy aluminum oxide trimer, the alkoxy group of which is the same as that of the aluminum alkoxide treated. During the process one mol of ether is liberated per mol of aluminum compound treated.

The cyclic alkoxy aluminum oxide trimers produced by any of the foregoing processes may be advantageously employed for the preparation of other substituted cyclic trimers. The trimer products react smoothly with organic hydroxy compounds and acids. In this reaction any alcohol of a higher number of carbon atoms than an alkoxy group of the cyclic trimer may be employed. Other hydroxy compounds are phenols, cyclohexanol, and any other mono-valent hydroxy compound free of functional groups which would interfere with the substitution reaction. Polyhydroxy compounds may also be employed having any number of carbon atoms including glycols such as propylene, glycol and hexanediol.

For the production of cyclic acylated aluminum oxide trimers, any organic acid may be employed, for examples the classes represented by acetic acid, octoic acid, methacrylic acid, benzoic acid, oleic acid, stearic acid, furoic acid, dodecyl benzene sulfonic acid, dialkyl hydrogen phosphate and benzene phosphonic acid, and as well the additional acids disclosed in applicant's copending application Serial No. 706,902, filed January 3, 1958, now abandoned.

The reaction of the cyclic alkoxy aluminum oxide trimers with the above described hydroxy compounds and acids can be carried out at a temperature of 70–80° C., or more, at which the reactants remain together in the reaction mass. During the reaction the alkoxy group or groups of the trimers are liberated in the form of alcohol and are vaporized off. The amount of the organic hydroxy compound or the acid reacted with each mol of the trimer can be from one mol to three mols but not more, for an excess, particularly of the acid, causes the cyclic chain to open and form insoluble hydroxy aluminum diacylate.

In place of the simple acids hereinbefore disclosed, acids in the form of their anhydrides can be employed. Of particular value are the derivatives produced by reaction of the alkoxy trimers with dicarboxylic anhydrides, examples of which are phthalic anhydride, maleic anhydride and dodecyl succinic anhydride. For this reaction, the cyclic alkoxy aluminum oxide trimer is preferably dissolved in a small quantity of toluene or other organic solvent to provide, for example, a 65% solution and to this solution there is then added per mol of the trimer 1–3 mols of the acid anhydride and the resulting mass is heated, as for example to a temperature of 100° C. A pure resin is obtained in solution in the organic solvent. When a lower molecular alkoxide has been used, the resin is unmeltable, unhydrolyzable even in boiling water and is compatible with nitrocellulose solutions in all ratios. Dried coatings produced from the resins are highly water and scratch resistant.

*Example 1*

Sixteen grams of water and 60 grams of isopropanol are vaporized and superheated to 120° C. and then slowly fed into a reaction flask kept at 80° C. containing 204 grams of aluminum isopropoxide and 60 grams of isopropanol under vigorous agitation. The batch becomes gradually changed into a slurry, which, on continued heating and on removal of isopropanol, becomes a dry white powder. Final temperature is 200° C. The yield is 100 grams.

The cyclic isopropoxy aluminum oxide trimer produced is an unmeltable solid readily soluble in aromatic and aliphatic hydrocarbons and in alcohols. Its molecular weight is 306 and its aluminum content is 26.5%. It is rather stable and hydrolyzes only slowly when exposed to the atmosphere, finally yielding aluminum oxide hydrate and isopropanol.

*Example 2*

One hundred and sixty-two grams of aluminum ethoxide is dissolved in 50 grams of toluene, heated to 80° C. and a superheated mixture of 17 grams of water and 70 grams of anhydrous ethanol are slowly fed into the reaction flask. A slurry is formed which on continued heating liquefies and releases ethanol. Temperature is raised to 150° C. and vacuum is applied to remove the solvents. The yield is 80 grams of white powder, consisting of cyclic trimer aluminum ethoxide.

*Example 3*

One hundred and two grams of aluminum isopropoxide are heated under reduced pressure (38 cm. Hg) to 180° C. and the vapor is mixed under agitation with a stream of super-heated steam and isopropanol vapor in the ratio of 10.2 grams of aluminum isopropoxide and 1.75 grams of steam. Condensation reactions proceed and a solid white powder of cyclic trimer aluminum isopropoxide precipitates. This is finally freed from isopropanol by vacuum.

*Example 4*

Two hundred and four grams of aluminum isopropoxide is heated to 250° C. After five hours the liquid becomes viscous and 80 grams of di-isopropylether have been distilled off. On continued heating at 240° C. the batch solidifies, yielding another 10 grams ether. The final yield is 112 grams cyclic trimer aluminum isopropoxide containing 10 grams of isopropylether which can be removed by heating in vacuum.

*Example 5*

Two hundred and four grams of aluminum isopropoxide and 176 grams of amylalcohol (mixture of isomers) are heated to 150° C. until 125 grams of a mixture of alcohols (mostly isopropanol) have distilled off. The batch is then heated to 265° C., at which temperature rapidly a mixture of ethers is evolved and distilled off. The batch becomes viscous, vacuum is applied and a dry white powder is obtained, weighing 130 grams and consisting of cyclic trimer aluminum amyloxide. It is fully soluble in toluene.

*Example 6*

Two hundred and eighteen grams of di-isopropoxy aluminum butoxide is heated to 250° C. until the mass solidifies. Vacuum is applied and 116 grams of a white powder is obtained consisting of a mixture of cyclic trimer aluminum isopropoxide and butoxide.

*Example 7*

The vapors of a boiling azeotropic mixture of 36 grams of water and 260 grams of isopropanol are introduced into 612 grams of aluminum isopropoxide, heated initially at 80° C. and finally at 120° C. after the addition of 50 grams of mineral spirits. Vapors of a boiling mixture of 16 grams of water and 115 grams of isopropanol are then passed into the batch, 50 grams of mineral spirits are added and the temperature raised to 170° C. Isopropanol distills off with part of the mineral spirits. Vacuum is applied. The yield is 350 grams of a white, finely divided, solid material, $(OAlOC_3H_7)_3$, containing 14% mineral spirits.

The mineral spirits provides an homogeneous medium for the reaction, the trimeric aluminum isopropoxide being unmeltable. Vacuum treatment will remove the mineral spirits and provide a powdered product.

The cyclic isopropoxy aluminum oxide trimer powder produced by the foregoing process is dissolved in isopropanol to provide a 65% solution and after being heated to 80° C. acetic acid is slowly added thereto until 3 mols have been added per mol of the trimer. When 3 mols of isopropanol have been liberated and distilled off, there remains cyclic trimeric aluminum oxide acetate.

In the foregoing process, any of the acids hereinbefore disclosed may be substituted in equivalent amounts and the corresponding acylate will be obtained.

*Example 8*

To a solution of 122.4 gm. aluminum isopropoxide in 100 gm. xylene heated at 90°–100° C. there is added a solution of 159 gm. technical oleyl alcohol in 10.8 gm. water, 100 gm. isopropanol and 100 gm. xylene. The solvents are distilled off and the temperature is raised to 150° C. whereupon vacuum is finally applied. A viscous oil is obtained (185 gm.) consisting mainly of trimer oxo aluminum trioleylate.

*Example 9*

To a solution of 102 gm. aluminum isopropoxide in 50 gm. xylene heated at 100° C. there is added a solution of 50 gm. cyclohexanol with 9 gm. water in 50 gm. toluene and 50 gm. isopropanol. The batch is treated as in Example 8 and it gradually becomes solid. Then 50 gm. xylene is added which dissolves the resinous polymer, and as a result 122 gm. of a clear solution is obtained composed of trimer oxo aluminum cyclohexanolate.

*Example 10*

To 68 gm. aluminum isopropoxide dissolved in 100 gm. xylene heated at 100° C. there is added a solution of 100 gm. of a rosin alcohol (Abitol) and 6 gm. water dissolved in 100 gm. xylene and 100 gm. isopropanol. The solvents are removed by distillation until 200° C. is finally reached. A viscous clear resin is obtained (120 gm.) composed of trimer oxo aluminum abitolate.

*Example 11*

To a solution of 40.8 gm. aluminum isopropoxide in 40 gm. xylene at 100° C. there is added a solution of 33 gm. amylphenol and 3.6 gm. water in 40 gm. xylene and 40 gm. isopropanol. The solvents are removed by distillation until 150° C. is reached, finally under vacuum. The cyclic trimer amyl phenoxide product is very viscous and dissolves easily in xylene. Yield 45 gm.

In place of the alkoxides of aluminum called for in the foregoing examples corresponding derivatives of other metals of trivalent and tetravalent character may be employed, in equivalent amounts, as for example the alkoxides of titanium, zirconium and iron. The cyclic trimers produced from alkoxides of these metals have been found to possess basically the same properties accompanied by various different properties.

Other compounds utilizable are obtained from cobalt, chromium, tin, lead, thorium, cerium and indium.

This application is a continuation-in-part of applicant's copending application Serial No. 639,638, filed February 12, 1957, now Patent No. 2,979,497.

It should be understood that the present invention is not limited to the specific compounds or details hereinbefore set out but that it extends to all equivalents which will occur to persons skilled in the art upon consideration of the general teachings of the invention and of the scope of the claims appended hereto.

I claim:

1. A process for the production of cyclic trimer alumina R-oxides in which R is a hydrocarbon group which comprises, introducing steam in substantially equimolecular amounts, into an aluminum alkoxide of an alcohol of 2–5 carbon atoms in the presence of an alcohol at an elevated temperature at which condensation reaction occurs and liberated alcohol vaporizes off as the reaction proceeds, and continuing the heating at a temperature at which and until about 2 mols of alcohol are liberated and vaporized off per mol of aluminum compound used.

2. A process for the production of cyclic alkoxy aluminum oxide trimers having 2–5 carbon atoms in each alkyl group which comprises, introducing steam into fluid aluminum alkoxide of an alcohol of 2–5 carbon atoms in substantially equimolecular proportions at an elevated temperature at which condensation reaction occurs and liberated alcohol vaporizes off as the reaction proceeds, and continuing the heating at a temperature at which and until about 2 mols of alcohol are liberated and vaporized off per mol of aluminum compound used.

3. A process for the production of cyclic alkoxy aluminum oxide trimers having 2–5 carbon atoms in each alkyl group which comprises, slowly introducing steam into liquid aluminum alkoxide of an alcohol of 2–5 carbon atoms in substantially equimolecular proportions at an elevated temperature at which reaction occurs with the liberation and vaporization of alcohol, refluxing the alcohol during the steam introduction, and thereafter continuing the heating without refluxing at a temperature at which and until about 2 mols of alcohol are liberated and vaporized off per mol of aluminum compound used.

4. A process for the production of cyclic alkoxy aluminum oxide trimers having 2–5 carbon atoms in each alkyl group which comprises, introducing a superheated mixture of steam and alcohol vapors into an alcoholic solution of an aluminum alkoxide of an alcohol of 2–5 carbon atoms, the amount of water introduced being from about .85 to 1 mol to each mol of the aluminum compound used, the reaction mass being at an elevated temperature at which condensation reaction occurs and liberated alcohol vaporizes off as the reaction proceeds, and continuing the heating at a temperature at which and until about 2 mols of alcohol are liberated and vaporized off per mol of aluminum compound used.

5. A process for the production of cyclic alkoxy aluminum oxide trimers having 2–5 carbon atoms in each alkyl group which comprises, preheating an organic solvent solution of an aluminum alkoxide of an alcohol of 2–5 carbon atoms to a temperature above about 70° C., introducing steam and vapors of said organic solvent into said preheated solution during heating, and continuing the heating of the reaction mixture and removal of alcohol from the reaction mass until no more alcohol is liberated during which heating the reaction mass reaches a final temperature of at least 150° C.

6. A process for the production of cyclic alkoxy aluminum oxide trimers having 2–5 carbon atoms in each alkyl group which comprises, preheating an aluminum alkoxide of an alcohol of 2–5 carbon atoms to a temperature above about 80° C., introducing steam into said heated alcoholate in liquid form in substantially equimolecular proportions during agitation of the reaction mass, vaporizing off the alcohol liberated by reaction during continuation of the heating to a final temperature above about 150° C., the heating being discontinued when no more alcohol is liberated.

7. A process for the production of cyclic alkoxy aluminum oxide trimers having 2–5 carbon atoms in each alkyl group which comprises, preheating an aluminum alkoxide of an alcohol of 2–5 carbon atoms to a temperature above about 80° C., introducing steam into said heated alcoholate in liquid form in substantially equimolecular proportions during agitation of the reaction mass, heating the reacting mixture under reflux of alcohol during said introduction until a jellying has occurred, and continuing the heating without refluxing to a final temperature above about 150° C. until no more alcohol is liberated, thereby producing the aluminum oxide trimer in the form of a white powder.

8. A process for the production of cyclic alkoxy aluminum oxide trimers having 2–5 carbon atoms in each alkyl group which comprises, preheating aluminum isopropoxide dissolved in isopropanol to a temperature of about 80° C., introducing steam and isopropanol vapors slowly into said solution during agitation and heating under reflux until about 1 mol but no more than 1 mol of water per mol of isopropoxide has been introduced, and continuing the heating without refluxing to a final temperature above about 150° C. until no more alcohol is liberated, thereby producing the aluminum oxide trimer in the form of a white powder.

9. A process for the production of cyclic alkoxy aluminum oxide trimers having 2–5 carbon atoms in each alkyl group which comprises, mixing steam and vapors of an aluminum alkoxide of an alcohol of 2–5 carbon atoms in substantially equimolecular proportions at an elevated temperature at which condensation and liberation of alcohol occurs, removing alcohol vapors so long as they are liberated, and collecting the cyclic trimeric alkoxy aluminum oxide precipitate formed.

10. A process for the production of cyclic alkoxy aluminum oxide trimers having 2–5 carbon atoms in each alkyl group which comprises, mixing substantially equimolecular proportions of superheated steam and vapors of an aluminum alkoxide of an alcohol of 2–5 carbon atoms in the presence of vapors of such an alcohol, agitating and reacting the mass during heating at temperatures which maintain the reactants in the vapor phase and cause the reaction to proceed to completion, removing from the reacting mass all the alcohol liberated by the reaction and collecting the solid aluminum oxide trimer formed.

11. A process for the production of cyclic trimer alumina R-oxides in which R is a hydrocarbon group which comprises, preheating an aluminum alkoxide of an alcohol of 2–5 carbon atoms to a temperature of from about 80° to 130° C., introducing an alcohol and water, substantially in the mol proportion of 1:1:1 into said heated alkoxide when in liquid form, continuing the heating and agitating the mass during the reaction in which alcohol is liberated and finally heating at a higher temperature which distills off the liberated alcohol and forms the cyclic aluminum oxide trimer.

12. A process for the production of cyclic trimer alumina R-oxides in which R is a hydrocarbon group which comprises, preheating an aluminum alkoxide of an alcohol of 2–5 carbon atoms to a temperature of from about 80° to 130° C., introducing an alcohol of a higher molecular weight than the alcohol of the alcoholate, and water substantially in the mol proportion of 1:1:1 into said heated alkoxide when in liquid form, continuing the heating and agitating the mass during the reaction in which alcohol is liberated and finally heating at a higher temperature which distills off the liberated alcohol and forms an alkoxy cyclic aluminum oxide trimer, the alkoxy group being that of the higher molecular weight alcohol employed.

13. The process which comprises reacting a cyclic alkoxy aluminum oxide trimer the alkoxy groups of which have 2–5 carbon atoms with a reactant selected from the group consisting of alcohols having a higher number of carbon atoms than an alkoxy group of the cyclic trimer, phenols, cyclohexanol, and glycols, in the mol proportion of not more than 3 of the reactant to 1 of the trimer, thereby to form and forming a cyclic aluminum oxide trimer having organic radicals of the reactants used attached to the aluminum atoms in the aluminum oxide ring.

14. A process for the production of cyclic alkoxy aluminum oxide trimers which comprises, heating an aluminum alkoxide at a high temperature at which an ether is liberated but below the vaporization point of the alkoxide and continuing the heating until 1 mol of ether has been liberated per mol of aluminum compound used, and vaporizing off said ether, leaving the cyclic alkoxy aluminum oxide trimer formed in solid condition.

15. A process for the production of cyclic alkoxy aluminum oxide trimers having 2–5 carbon atoms in each alkyl group which comprises, heating an aluminum alkoxide of an alcohol having 2–5 carbon atoms to a temperature of from about 200° to 300° C., continuing the heating over a period of a plurality of hours while vaporizing off the ether formed.

16. A process for the production of cyclic alkoxy aluminum oxide trimers having 2–5 carbon atoms in each alkyl group which comprises, boiling an azeotropic mixture of a lower molecular alcohol and water, introducing the resulting vapors into a liquefied aluminum alkoxide of an alcohol having 2–5 carbon atoms, heating the resulting mass in the presence of a higher molecular hydrocarbon to a temperature causing reaction of the water with the alkoxide involving liberation of alcohol from the alkoxide, said temperature being below that causing vaporization of more than a part of said hydrocarbon, whereby at least part of said hydrocarbon remains as a reaction medium, continuing the heating until about 2 mols of alcohol per mol of aluminum compound used have been liberated and vaporized off.

17. Cyclic aluminum oxide polymers of the formula:

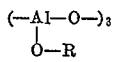

wherein R is a hydrocarbon radical.

18. Cyclic aluminum oxide polymers of the formula:

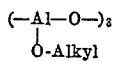

19. Cyclic aluminum oxide polymers of the formula:

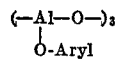

20. Cyclic aluminum oxide polymers of the formula:

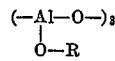

wherein R is a hydrocarbon radical having 1–18 carbon atoms.

21. Cyclic aluminum oxide polymers of the formula:

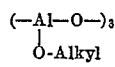

said alkyl radical having 1–18 carbon atoms.

22. Cyclic aluminum oxide polymers of the formula:

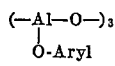

said aryl radical being selected from the groups consisting of phenyl and cresyl radicals.

23. A process for the production of polymeric alumina isopropoxide which comprises introducing steam into fluid aluminum isopropoxide in substantially equimolecular amounts at an elevated temperature at which condensation reaction occurs and liberated alcohol vaporizes off as the reaction proceeds, and continuing the heating at a temperature at which and until about 2 mols of alcohol are liberated and vaporized off per mol of aluminum compound used.

References Cited in the file of this patent

UNITED STATES PATENTS 2,744,074    Theobald _____ May 1, 1956